United States Patent
Humphrey et al.

[11] Patent Number: 5,376,199
[45] Date of Patent: Dec. 27, 1994

[54] METHOD OF MAKING A COMPOSITE FILAMENT REINFORCED CLEVIS

[75] Inventors: William D. Humphrey; Alan G. Reiners, both of Lincoln, Nebr.

[73] Assignee: Brunswick Corporation, Lake Forest, Ill.

[21] Appl. No.: 110,873

[22] Filed: Aug. 24, 1993

[51] Int. Cl.⁵ ............ B29C 53/56; B29C 67/14; B65H 81/00
[52] U.S. Cl. .................. 156/172; 156/175; 264/257; 264/328.2; 403/157
[58] Field of Search ............ 156/161, 172, 173, 175, 156/245; 264/103, 257, 316, 328.2, 325, 571, 137; 403/157, 267; 416/134 A, 230 A, 230 R

[56] References Cited

U.S. PATENT DOCUMENTS

| | | | |
|---|---|---|---|
| 2,349,705 | 5/1944 | Clark | 264/257 |
| 3,290,419 | 12/1966 | Groff et al. | 156/173 |
| 4,226,550 | 10/1980 | Kupcak et al. | 403/157 |
| 4,226,916 | 10/1980 | Schulz et al. | 156/173 |
| 4,382,712 | 5/1983 | Buchs et al. | 156/172 |
| 4,460,531 | 7/1984 | Harris et al. | 156/173 |
| 4,548,663 | 10/1985 | Worcester | 156/245 |
| 4,650,620 | 3/1987 | Owen et al. | 264/257 |
| 4,853,060 | 8/1989 | Nickel | 156/172 |
| 4,868,962 | 9/1989 | McArdle et al. | 416/134 A |
| 4,973,372 | 11/1990 | Ditlinger | 156/172 |
| 5,047,106 | 9/1991 | Matsumoto et al. | 156/169 |

Primary Examiner—Jay H. Woo
Assistant Examiner—Robert B. Davis
Attorney, Agent, or Firm—Wood, Phillips, VanSanten, Hoffman & Ertel

[57] ABSTRACT

A composite filament reinforced clevis includes a pair of apertured ends and a central hub area with a pair of clevis arms extending between the hub area and the apertured ends. The clevis is fabricated by winding reinforcing filaments around a pair of end mandrels and toward the central hub area. The end mandrels and the filaments wound thereon are rotated relative to the central hub area to a collinear orientation. The reinforcing filaments are cured with a bonding matrix while in the rotated orientation.

18 Claims, 3 Drawing Sheets

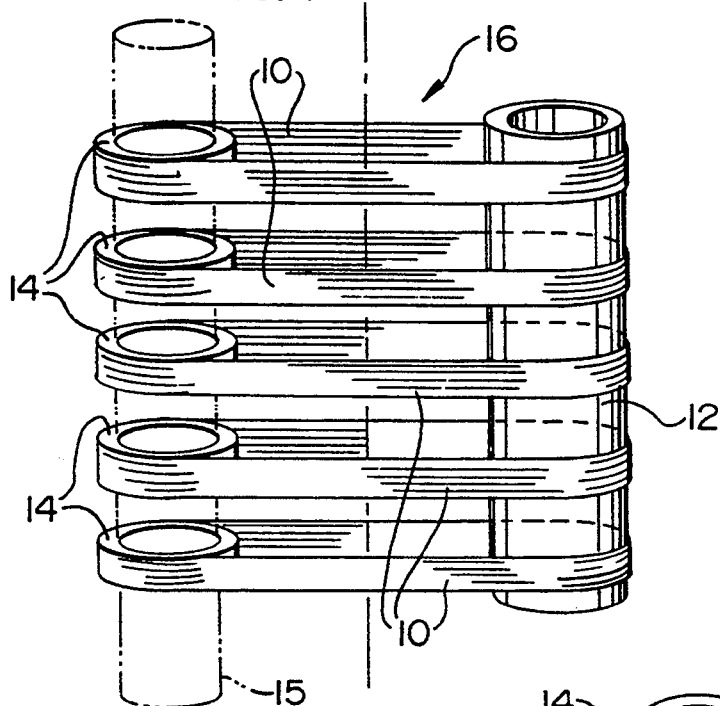
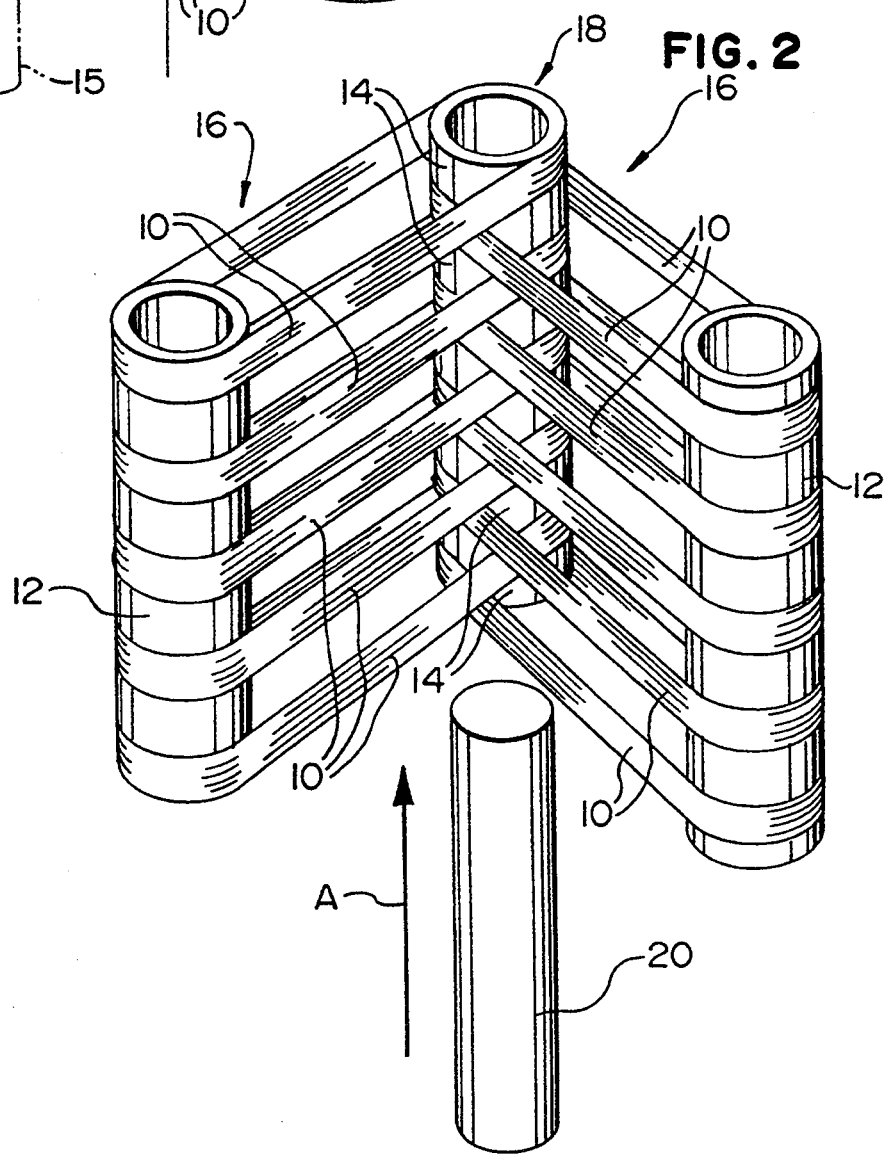

METHOD OF MAKING A COMPOSITE FILAMENT REINFORCED CLEVIS

FIELD OF THE INVENTION

This invention generally relates to the art of devises and, particularly, to a new and improved clevis fabricated from lightweight composite filament reinforced materials.

BACKGROUND OF THE INVENTION

A clevis is a load-transmitting device providing an interconnection between a pair of structures having relative movement therebetween in different planes. A clevis generally is U-shaped to define two ends which are perforated or have holes linearly aligned for receiving a clevis pin, for instance. The base of the U-shaped device simply can be a bent form or, quite often, also have a perforation or hole for receiving a pin-like structure generally perpendicular to the clevis pin through the perforated ends.

Although clevises were used many years ago for such applications as at the end of a wagon tongue, clevises today are used in a variety of high technological applications which require high strength, low weight, low heat transfer properties, and electrical non-conductivity of a connection.

By way of example only, devises have been used at the ends of composite tension straps of the type used in cryogenic dewars. For instance, a cryogenic dewar can have hundreds of composite tension straps extending between a vacuum vessel wall and a coil pack wall of the cryogenic dewar. Such devices can be subjected to a cyclic tension loading application for a duration of 30 years or longer in a vacuum and can be exposed from temperatures ranging from cryogenic (1.8K.) to ambient. Metal devises have been used as interfacing/interconnecting devices at the ends of the composite tension straps, and the metal clevises continue to present problems due to the high thermal expansion and high heat transfer properties of metallic structures. In addition to the undesirability of metal devises for thermal considerations, metal devises are counter productive due to their extreme weight, and special fixturing is required for installation.

This invention is directed to providing a strong lightweight composite clevis which circumvents the weight and thermal conductivity problems of metal clevises, and to satisfy a definite need in this technology.

SUMMARY OF THE INVENTION

An object, therefore, of the invention is to provide a new and improved lightweight composite clevis of the character described, along with novel methods of making the same.

Generally, the invention contemplates a method of making a composite filament reinforced clevis having a pair of apertured ends and a central hub area, with a pair of clevis arms extending between the hub area and the apertured ends. The method includes the steps of winding reinforcing filament means around a pair of end mandrels and toward the hub area. The end mandrels and the filament means wound thereon then are rotated relative to the central hub area to a collinear orientation. This assembly then is cured with a bonding matrix while in the rotated orientation.

With such a method, the end mandrels may be removed after curing to leave apertures in the ends of the clevis form, for use with a clevis pin or other interconnecting structure. Or, bushings may be installed in the end apertures after curing. Still further, the end mandrels may be provided by hollow metal bushings which remain in position in the clevis ends after curing.

In one embodiment of the invention, the filament winding means are wound around each end mandrel and a series of coaxially aligned, axially spaced ring-like mandrel segments to form a pair of clevis arm subassemblies. The ring-like mandrel segments then are interengaged at the central hub area in a "piano-hinge" fashion.

In another embodiment of the invention, the reinforcing filament means are wound about the outside of a central hub mandrel as well as around the pair of end mandrels.

The reinforcing filament means may be preimpregnated with a curable matrix material before winding, and, thereby, the wound structure is provided with the bonding matrix for curing. Alternatively, the resin impregnation and curing steps may be carried out by a resin transfer molding (RTM) process.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a somewhat schematic illustration of how one of the subassemblies of one embodiment of the invention is wound by filaments about an end mandrel and the ring-like mandrel segments;

FIG. 2 is an illustration of a technique for interconnecting two subassemblies as shown in FIG. 1;

DETAILED DESCRIPTION OF THE PREFERRED EMBODIMENTS

Figure 3:
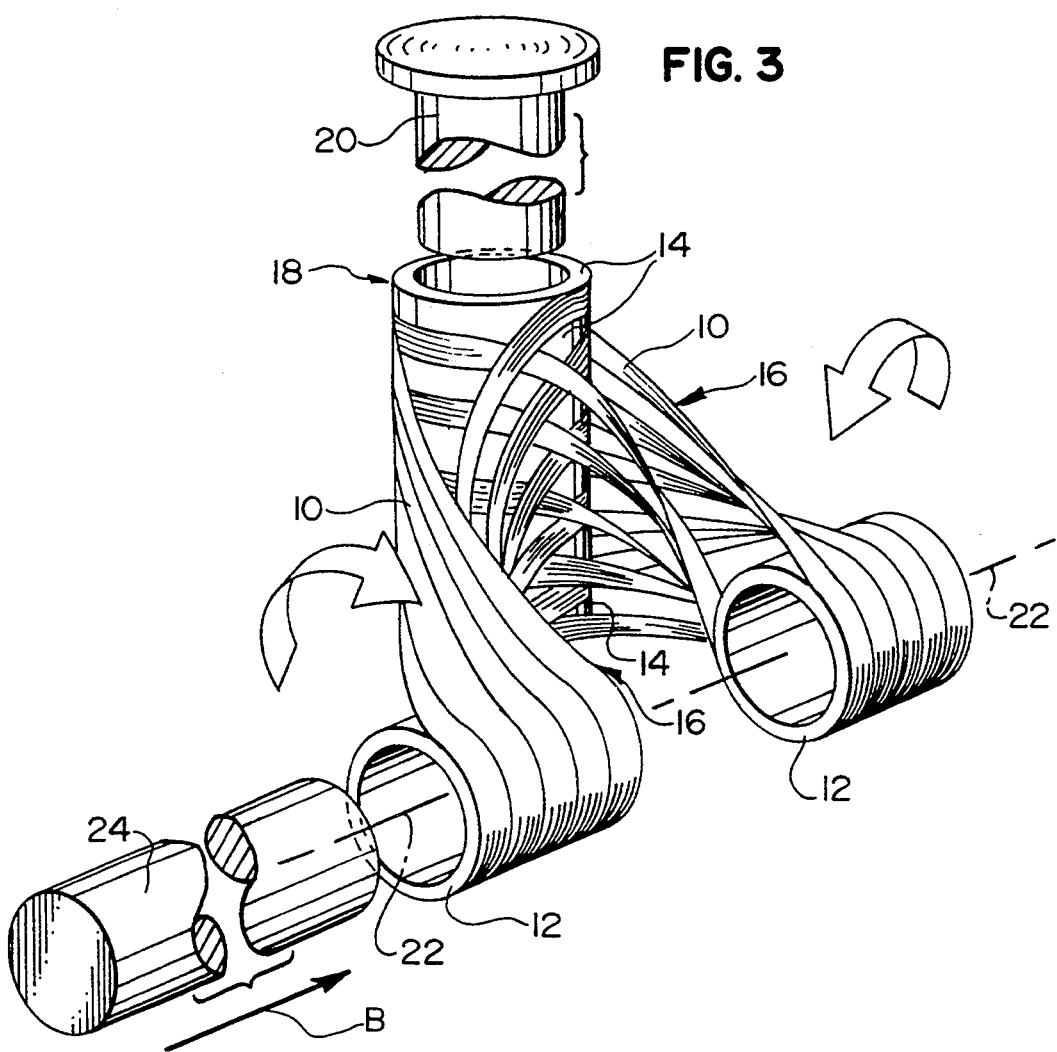
FIG. 3 illustrates how the ends of the two subassemblies are rotated relative to the central hub area of the assembly.
Figure 4:
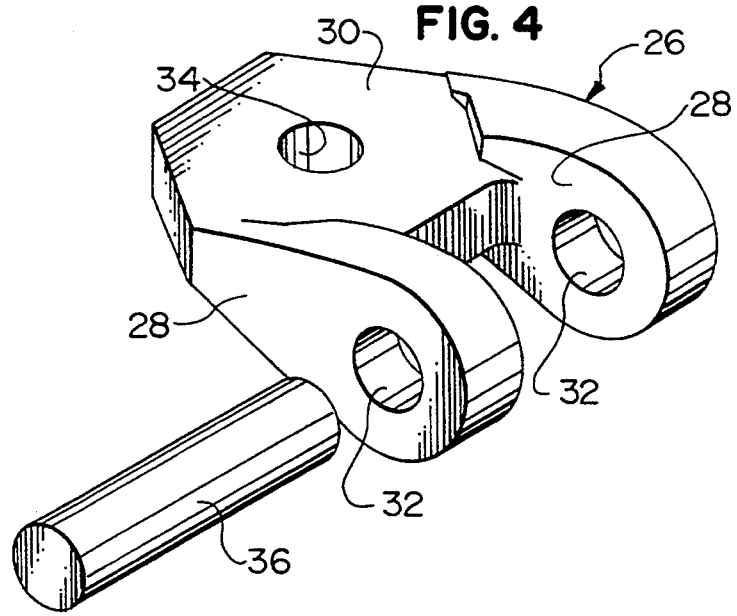
FIG. 4 is a perspective view of a final clevis configuration, following an RTM process.
Figure 5:
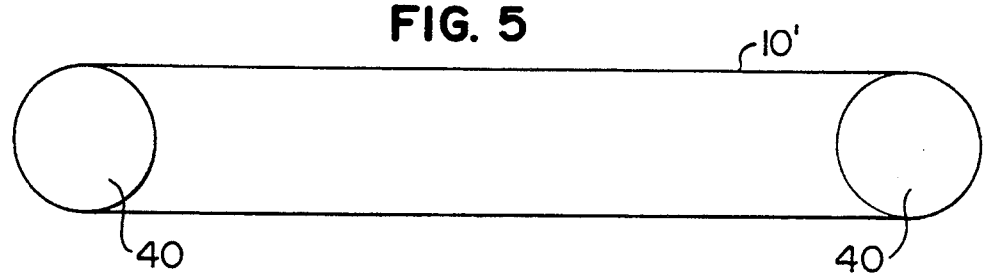
FIG. 5 illustrates the first step in an alternative method of fabricating a clevis.
Figure 6:
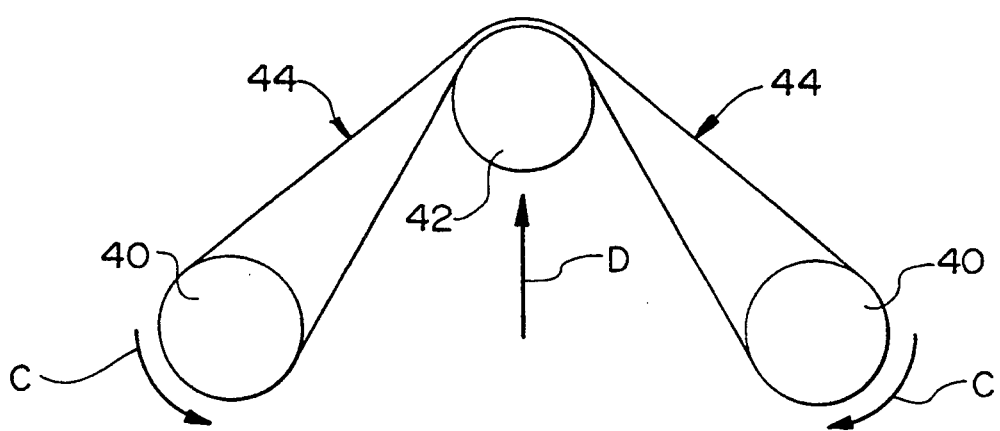
FIG. 6 illustrates the next step in the alternative method.
Figure 7:
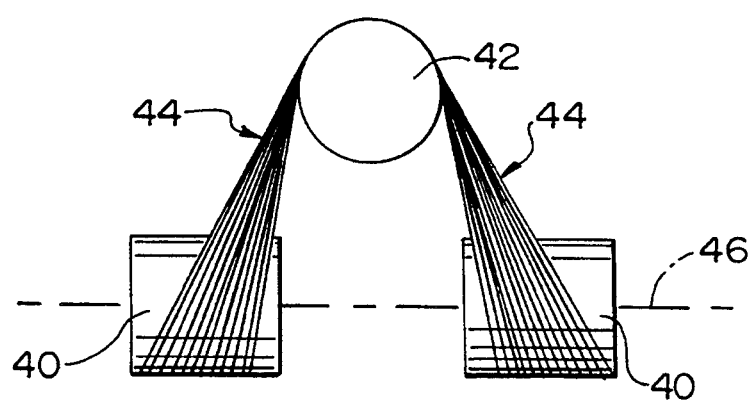
FIG. 7 illustrates a further step in the alternative method, prior to curing.

Referring to the drawings in greater detail, FIGS. 1–4 illustrate various steps in a first method of making a composite filament reinforced clevis according to the invention, and FIGS. 5–7 show a second method of making the clevis. Generally, both methods involve fabricating a clevis having a pair of apertured ends and a central hub area with a pair of clevis arms extending between the hub area and the apertured ends. Only three general steps are required in the method of the invention. First, the reinforced filament means are wound around a pair of end mandrels and toward the hub area. Second, the end mandrels and the filament means wound thereon then are rotated relative to the central hub area to a collinear orientation. Third, the reinforcing filament means then are cured with a bonding matrix while in the rotated orientation.

More particularly, referring to the method of the invention illustration in FIGS. 1-4, FIG. 1 illustrates how one of the two clevis arms are wound in a subassembly. Specifically, reinforcing filament means 10 are wound in bands about an end mandrel 12 and a plurality of ring-like mandrel segments 14. It can be seen that the ring-like mandrel segments are coaxially aligned and axially spaced. The segments can be maintained in this alignment and spacing by appropriate fixturing, such as a fixture pin 15 shown in phantom in FIG. 1. As will be understood hereinafter, mandrel 12 defines one apertured end of the clevis, and mandrel segments 14 define the inner end of one of the clevis arms at a hub area of the clevis. In essence, FIG. 1 represents the first step in filament winding one of two subassemblies, generally designated 16, which are combined to make the final clevis.

FIG. 2 shows two subassemblies 16 of FIG. 1 assembled at a central hub area, generally designed 18, by means of interleaving the ring-like mandrel segments of the two subassemblies in a "piano-hinge" fashion. A fixture pin 20 is inserted, as indicated by arrow "A", into the ring-like mandrel segments to hold the two subassemblies together and define the eventual clevis arms of the final product. Alternately a hollow metal bushing may be permanently installed inside the piano-hinge joint and then the fixture pin 20, installed during the remaining processing. Reinforcing filament means 10 wound around central hub area 18 and fixture pin 20 permit a clevis resulting from the interconnection of two or more subassemblies 16 to carry compressive loads as well as tension.

FIG. 3 shows the next step wherein end mandrels 12, along with the reinforcing filament means wound thereon, are rotated relative to central hub area 18 to a collinear orientation represented by axis 22. In essence, the end mandrels are rotated 90° from the position shown in FIG. 2. A fixture pin 24 is inserted, as indicated by arrow "B", into the end mandrels 12 at the ends of each subassembly 16.

The assembly shown in FIG. 3 can be cured in place to produce a very lightweight clevis structure. Of course, proper fixturing would be required for the curing or heating process. An axial compacting step might be used at the mandrel ends as well as the hub area prior to curing. In addition, reinforcing filament means 10 may be preimpregnated with a bonding matrix to facilitate immediate curing once the assembly is formed as shown in FIG. 3. The matrix may be an appropriate epoxy, appropriate thermoset or an appropriate thermoplastic material. The filament means may be fiberglass, KEVLAR (aromatic polyamide fibers) carbon, or other filaments.

In another equally attractive process, the filament wound assembly shown in FIG. 3 can be used as a preform for a subsequent resin transfer molding (RTM) process to complete the clevis fabrication. Specifically, a tackifier can be used on the assembly of FIG. 3, and then the assembly constitutes a preform which is placed in an appropriately configured injection mold cavity. Injection molding material is injected into the cavity, and the configuration is cured as is known in conventional RTM processing. For instance, FIG. 4 shows a configuration of a final clevis product, generally designated 26, which has been fabricated in a RTM process. Clevis 26 has a pair of clevis arms 28 projecting from a central hub area 30. The clevis arms have collinearly aligned apertures 32, and the central hub area has an aperture 34 in a direction perpendicular to the axis of apertures 32. A clevis pin 36 is shown for insertion into apertures 32. With a RTM process, very refined and clean clevis configurations can be fabricated as shown in FIG. 4, with the internal filament means forming the load-bearing means of the clevis.

Turning to FIGS. 5-7, an alternative method is illustrated for filament winding a clevis. Referring first to FIG. 5, reinforcing filament means 10' are somewhat schematically illustrated as being wound about a pair of end mandrels 40.

Turning next to FIG. 6, the end mandrels 40 are moved relative to a central mandrel 42, as indicated by arrows "C" for the end mandrels and arrow "D" for the central mandrel. In other words, the reinforcing filament means 10', in essence, are wound around the central mandrel to define a pair of clevis arms, generally designated 44.

The next step in the alternative method of FIGS. 5 and 6, is to rotate end mandrels 40 and the filament means wound thereon, relative to central mandrel 42 and the filament means wound thereon, approximately 90° to a collinear orientation as represented by axis 46. Reference then can be made to the above description of the method involving FIGS. 1-4, and it can be understood that the assembly of FIG. 7 then can be cured in place by appropriate fixturing and proper matrix impregnation, or the assembly can be used as a preform for a RTM process.

In either of the methods represented by FIGS. 1-4 or FIGS. 5-7, various different approaches can be taken in the apertured ends of the clevis during fabrication. For instance, end mandrels 12 (FIGS. 1-4) or end mandrels 40 (FIGS. 5-7) may be coated with a release material as is well known in the filament winding art, and the end mandrels can be removed to leave apertures in the ends of the clevis arms. Alternatively, after removing the mandrels, bushings may be inserted into the apertures. For instance, in many applications, a metal-to-metal interface is required, and the bushings may be provided as hollow metal components. Still further, the end mandrels themselves may be provided in the form of metal bushings and simply remain in place after final curing and fabrication of the clevis structure.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A method of making a composite filament reinforced clevis having a pair of apertured ends and a central hub area with a pair of clevis arms extending between the hub area and the apertured ends, comprising:

winding reinforcing filament means around a pair of end mandrels and toward the hub area;
rotating the end mandrels and the filament means wound thereon relative to the central hub area to a collinear orientation while the central hub area is fixed against rotation; and curing a bonding matrix that has been applied to the reinforcing filament means while the reinforcing filament means are in said orientation.

2. The method of claim 1, including removing said end mandrels to leave apertures in said ends for use with a clevis pin.

3. The method of claim 2, including positioning bushings in said apertures.

4. The method of claim 1, including providing said end mandrels as hollow metal bushings which remain in position in said ends after curing.

5. The method of claim 4, including providing hollow metal bushings at said central hub area with the bushings in position after curing.

6. The method of claim 1, including winding the reinforcing filament means about the outside of a central hub mandrel as well as around said pair of end mandrels.

7. The method of claim 1, including winding the reinforcing filament means around each said end mandrel and a series of coaxially aligned, axially spaced ring mandrel segments to form a pair of clevis arm subassemblies, and interengaging the clevis arm subassemblies at said central hub area.

8. The method of claim 7, wherein said clevis arm subassemblies are interengaged by interleaving the ring mandrel segments in a piano-hinge fashion.

9. The method of claim 1, wherein said reinforcing filament are preimpregnated with a curable matrix material.

10. The method of claim 1, wherein said bonding matrix is supplied to the reinforcing filament means after filament winding.

11. A method of making a composite filament reinforced clevis having a pair of apertured ends and a central hub area with a pair of clevis arms extending between the hub area and the apertured ends, comprising:

filament winding each of said clevis arms as a subassembly by winding reinforcing filament means around an end mandrel at one end of the arm and a series of coaxially aligned, axially spaced ring mandrel segments at an opposite end of the arm;

interengaging the clevis arm subassemblies by interleaving the ring mandrel segments of the two subassemblies in a piano-hinge fashion;

rotating the end mandrels and the filament means wound thereon relative to the central hub area to a collinear orientation; and curing a bonding matrix that has been applied the reinforcing filament means while the reinforcing filament means are in said orientation.

12. The method of claim 11, wherein said reinforcing filament means are preimpregnated with a curable matrix material.

13. The method of claim 11, wherein said bonding matrix is supplied to the reinforcing filament means after filament winding.

14. The method of claim 11, including removing said end mandrels to leave apertures and positioning bushings in the apertures for accommodating a clevis pin.

15. A method of making a composite filament reinforced clevis having a pair of apertured ends and a central hub area with a pair of clevis arms extending between the hub area and the apertured ends, comprising:

winding reinforcing filament means around a pair of end mandrels;

moving the pair of end mandrels and the filament means wound thereon relative to a central mandrel to bend the wound filament means about the central mandrel to define the pair of clevis arms projecting from the central hub area at the central mandrel;

rotating the end mandrels and the filament means wound thereon relative to the central mandrel to a collinear orientation; and curing a bonding matrix that has been applied to the reinforcing filament means while the reinforcing filament means are in said orientation.

16. The method of claim 15, wherein said reinforcing filament means are preimpregnated with a curable matrix material.

17. The method of claim 15, wherein said bonding matrix is supplied to the reinforcing filament means after filament winding.

18. The method of claim 15, including removing said end mandrels to leave apertures and positioning bushings in the apertures for accommodating a clevis pin.

* * * * *